UNITED STATES PATENT OFFICE.

JOHN F. CAVANAGH, OF PROVIDENCE, RHODE ISLAND, ASSIGNOR TO THE CONNECTICUT TELEPHONE & ELECTRIC CO., INC., OF MERIDEN, CONNECTICUT, A CORPORATION OF CONNECTICUT.

MOLDED ARTICLE AND PROCESS OF MAKING THE SAME.

1,357,147.     Specification of Letters Patent.     Patented Oct. 26, 1920.

No Drawing. Application filed March 12, 1919, Serial No. 282,104. Renewed September 4, 1920. Serial No. 408,305.

*To all whom it may concern:*

Be it known that I, JOHN F. CAVANAGH, a citizen of the United States of America, residing at Providence, Rhode Island, have invented a new and useful Molded Article and Process of Making the Same, of which the following is a specification.

It has been customary in the past to mold many articles out of various compositions containing a shellac base together with other ingredients such as rotten stone, mica and asbestos, but so far as I am aware, such articles are not capable of withstanding more than 135° to 150° F. Above these temperatures such articles lose their finish and become distorted and misshapen upon application of pressure and in fact, sometimes warp from the internal stresses developed in the molding processes.

The main object of my invention is the economical production of molded articles which will stand temperatures from 200° to 300° F. without distortion or weakening, and which have high di-electric properties, are of considerable strength and with difficulty flammable, of low absorptive capacity and capable of taking a high durable finish.

The preferred embodiment of the invention contemplates a composition comprising four parts of asbestos and three parts of shellac by weight. The asbestos may be of the ordinary commercial grade of short fiber and the shellac the grade known commercially as T. N. which comes in flakes. These ingredients are preferably first mixed in a tumbling barrel or other mixing device at room temperature for a period of about a half hour. The composition is then treated by ordinary heated mixing rolls for a period of about a half hour so that the asbestos is intimately incorporated in the shellac when it is preferably taken off in sheet form, the sheets being approximately one-quarter of an inch thick. The sheets are then baked in an oven at a temperature somewhat above 300° F. and preferably to about 350° F. During this baking, certain volatile ingredients pass off, the composition at first softening and then gradually becoming resilient and then more resistent until quite firm. The process should stop short of carbonization and may be accomplished ordinarily in about two hours. The composition is then removed from the oven and allowed to cool when it becomes quite hard and brittle. It is then crushed to a fine powder about the consistency of fine table salt, although some of the particles may be slightly larger. This powder is quite dry and can be very easily handled and is susceptible of being used in what are commonly termed positive molds. In this respect, the process is radically different from the ordinary shellac processes which employ overflow molds.

The molds are heated to a temperature of from 300° to 400° F., and the powdered composition filled into the molds and held under heavy pressure for about one minute in the molds at this temperature. Then the molds are cooled to about 200° F., which may take a minute or less and the article is finished.

Although the proportions above given are considered the most desirable for producing a strong article which will withstand a temperature well over 200° F., it should be understood that some variations in the proportions may be made without departing from the broad scope of my invention. I have found, however, that a reduction in the percentage of shellac produces a composition which flows poorly and is likely to be more absorbent. On the other hand, an increase in the percentage of shellac decreases the heat resistance of the article.

Certain of the advantages of the process may be obtained by substituting rotten stone or mica for part of the asbestos where the strength of the article is of less importance.

Some of the advantages of this process may be obtained even though the shellac be adulterated with some other resinous substance.

It should be understood that certain advantages may be obtained by heat treating or baking the shellac, then crushing it to a fine powder and afterward mixing it with an inert body which can be molded as above set forth. This, however, does not have the strength or uniformity of the material in which the asbestos is intimately mixed with the shellac before heat treating.

An advantage of my invention which is of considerable importance results from the fact that the material is in a powdered form when placed in the molds. There is, therefore, no waste as there is in the usual method of molding where the composition is placed in the mold in the form of a heated plastic mass, and in which old process much material is lost by overheating and sticking on the steam tables and overflow in the molds.

I have specified herein the preferred ingredients and steps which I have found produce satisfactory results. It should be understood however that I consider the invention broad enough to cover equivalent materials which under similar treatment produce substantially equivalent results. Although I prefer to use shellac it is possible that some similar gum when treated as herein set forth will produce substantially the same results.

I claim:

1. The process of forming a molded composition which comprises intimately mixing asbestos and shellac, baking the mixture to a temperature of approximately 350° F., allowing it to cool, crushing it to a fine powder, molding the powder under pressure to a temperature of approximately 300° F., and cooling it while under pressure.

2. The process of forming a molded article which comprises mixing asbestos and shellac in substantially the proportions set forth, baking the mixture until firm, then crushing it to a fine powder, and then molding the powder under pressure at a temperature substantially above normal atmosphere.

3. The process of forming a molded article which comprises mixing approximately three parts of shellac with four parts of an inert substance, baking the mixture so as to drive off certain volatile matter, then crushing it to a fine powder, then compressing it at a temperature of approximately 300° F., and then cooling it while under pressure.

4. The process of forming a molded article which comprises intimately mixing shellac with an inert base in a finely divided form, baking the mixture to a temperature of somewhat above 300° F., reducing it to a fine powder, molding it under pressure at a temperature of upward of 300° F., and then cooling it while it is still under pressure.

5. The process of forming a molded article which includes subjecting to high pressure in molds at a temperature of approximately 300° F. a mixture of a previously baked finely divided shellac-like material from which certain volatile matter has been previously driven off and an inert base and then cooling it while still under pressure in the mold.

6. An article formed of asbestos and shellac in substantially the proportions herein set forth, intimately mixed, baked to a temperature of approximately 350° F., then crushed and then molded under pressure at a temperature of upward of 300° F. and characterized by the capacity to resist heat to a temperature of upward of 200° F. without distortion.

7. An article of manufacture consisting of a mixture of a shellac-like substance baked to a temperature sufficient to drive off certain volatile matter contained therein and an inert base crushed to fine powder and then molded under pressure at a temperature upward of 300° F. and characterized by a capacity to resist heat to a temperature of upward of 200° F. without distortion.

8. The process of forming a molded article which includes baking a shellac-like substance to a temperature somewhat above 300° F. and driving off certain volatile elements, allowing it to cool, crushing it to a fine powder mixed with an inert base, molding the mixture under pressure at a temperature of approximately 300° F. and cooling it while under pressure.

9. A composition suitable for molding under pressure and heat to form articles capable of resisting temperature of upward of 200° F., said composition comprising an intimate finely divided mixture of a shellac-like gum and an inert base, said gum having been previously baked to a temperature of approximately 350° F. so as to drive off certain volatile matter and then crushed to a fine powder.

10. The process of forming a molded article which comprises mixing a shellac-like gum and an inert base at a temperature somewhat higher than atmospheric temperature, baking the mixture at a temperature of upward of 300° F. to drive off certain volatile matter, crushing it to a fine powder, then molding it under pressure and with heat to a temperature upward of 300° F., and then cooling it while in the mold.

JOHN F. CAVANAGH.